United States Patent
Sharony et al.

(10) Patent No.: US 7,668,201 B2
(45) Date of Patent: Feb. 23, 2010

(54) BANDWIDTH MANAGEMENT IN WIRELESS NETWORKS

(75) Inventors: Jacob Sharony, Dix Hills, NY (US); Moushumi Sen, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 1006 days.

(21) Appl. No.: 10/919,622

(22) Filed: Aug. 17, 2004

(65) Prior Publication Data

US 2005/0047343 A1 Mar. 3, 2005

Related U.S. Application Data

(60) Provisional application No. 60/498,570, filed on Aug. 28, 2003.

(51) Int. Cl.
*H04J 3/16* (2006.01)
*G01R 31/08* (2006.01)

(52) U.S. Cl. .......... 370/468; 370/465; 370/235; 370/230; 709/224; 714/748

(58) Field of Classification Search ............ 370/468, 370/465, 464, 235, 229, 428, 316, 338; 709/224; 714/748

See application file for complete search history.

(56) References Cited

U.S. PATENT DOCUMENTS

| | | | |
|---|---|---|---|
| 5,508,707 A | 4/1996 | LeBlanc et al. | |
| 5,708,656 A | 1/1998 | Noneman et al. | 370/335 |
| 6,104,344 A | 8/2000 | Wax et al. | |
| 6,212,194 B1 | 4/2001 | Hsieh | 370/414 |
| 6,233,236 B1 | 5/2001 | Nelson et al. | 370/359 |
| 6,366,569 B1 | 4/2002 | Ritter | |
| 6,594,468 B1 | 7/2003 | Ramanathan | |
| 6,615,382 B1 * | 9/2003 | Kang et al. | 714/748 |
| 6,738,020 B1 | 5/2004 | Lindskog et al. | |
| 6,853,348 B1 | 2/2005 | Jung et al. | |
| 6,909,399 B1 | 6/2005 | Zegelin et al. | |
| 6,925,094 B2 | 8/2005 | Sharony et al. | |
| 6,985,455 B1 * | 1/2006 | Heath et al. | 370/316 |
| 7,035,240 B1 | 4/2006 | Balakrishnan et al. | |
| 7,039,001 B2 | 5/2006 | Krishnan et al. | |
| 7,085,247 B2 * | 8/2006 | Schweinhart et al. | 370/316 |
| 7,095,709 B2 | 8/2006 | Walton et al. | |

(Continued)

FOREIGN PATENT DOCUMENTS

| | | |
|---|---|---|
| EP | 1185048 | 3/2002 |
| WO | 0034799 | 6/2000 |
| WO | 03084160 | 10/2003 |
| WO | 2005006638 | 1/2005 |

OTHER PUBLICATIONS

U.S. Appl. No. 10/253,005, filed Sep. 23, 2002, Sharony.
Shreedhar, M.; Varghese, George; *Efficient Fair Queuing Using Deficit Round-Robin*, IEEE/ACM Transactions on Networking, vol. 4, No. 3, Jun. 1996, pp. 375-385.

(Continued)

*Primary Examiner*—Aung S Moe
*Assistant Examiner*—Jamal Javaid

(57) ABSTRACT

A method and apparatus are provided for bandwidth management. The method includes receiving a value representative of a target bandwidth from a remote device; storing a data packet in a data queue; associating a quantum of bandwidth to the data queue, wherein the quantum of the bandwidth is a function of at least the target bandwidth and time; and transmitting the data packet based on at least the quantum associated with the data queue. A method and apparatus for network congestion control are also provided.

12 Claims, 5 Drawing Sheets

U.S. PATENT DOCUMENTS

| | | | |
|---|---|---|---|
| 7,099,678 B2 | 8/2006 | Vaidyanathan | |
| 7,110,350 B2 | 9/2006 | Li et al. | |
| 7,151,809 B2 | 12/2006 | Ketchum et al. | |
| 7,164,929 B2 | 1/2007 | Sharony | |
| 7,277,414 B2 | 10/2007 | Younis et al. | |
| 7,305,696 B2 * | 12/2007 | Thomas et al. | 725/114 |
| 2001/0026546 A1 * | 10/2001 | Schieder et al. | 370/338 |
| 2002/0034263 A1 | 3/2002 | Schmidl et al. | |
| 2002/0041635 A1 | 4/2002 | Ma et al. | |
| 2002/0138443 A1 * | 9/2002 | Schran et al. | 705/64 |
| 2002/0168992 A1 | 11/2002 | Eiden et al. | |
| 2002/0174216 A1 * | 11/2002 | Shorey et al. | 709/224 |
| 2002/0181390 A1 | 12/2002 | Mody et al. | |
| 2003/0023915 A1 | 1/2003 | Choi | 714/748 |
| 2003/0048770 A1 | 3/2003 | Proctor | |
| 2003/0072452 A1 | 4/2003 | Mody et al. | |
| 2003/0120705 A1 | 6/2003 | Chen et al. | 709/104 |
| 2003/0154435 A1 | 8/2003 | Claussen et al. | |
| 2003/0161421 A1 | 8/2003 | Schmidt et al. | |
| 2003/0222823 A1 | 12/2003 | Flint et al. | |
| 2003/0235147 A1 | 12/2003 | Walton et al. | |
| 2004/0013128 A1 | 1/2004 | Moreton et al. | |
| 2004/0023621 A1 | 2/2004 | Sugar et al. | |
| 2004/0033806 A1 | 2/2004 | Daniel et al. | 455/450 |
| 2004/0042493 A1 | 3/2004 | Emmot | |
| 2004/0066754 A1 | 4/2004 | Hottinen | |
| 2004/0082356 A1 | 4/2004 | Walton et al. | |
| 2004/0179627 A1 | 9/2004 | Ketchum et al. | |
| 2004/0258025 A1 | 12/2004 | Li et al. | |
| 2004/0266465 A1 | 12/2004 | Zegelin et al. | |
| 2005/0096091 A1 | 5/2005 | Sharony | |
| 2005/0135321 A1 | 6/2005 | Sharony | |
| 2005/0174973 A1 * | 8/2005 | Kandala et al. | 370/338 |
| 2006/0221873 A1 | 10/2006 | Sharony | |
| 2006/0221904 A1 | 10/2006 | Sharony | |
| 2006/0221928 A1 | 10/2006 | Sharony | |
| 2007/0091893 A1 * | 4/2007 | Yazaki et al. | 370/392 |
| 2007/0160016 A1 | 7/2007 | Jain | |

OTHER PUBLICATIONS

Semeria, Chuck; *Supporting Differentiated Service Classes: Queue Scheduling Disciplines*, Juniper Networks, Inc., 2001, 27 pages.

Varghese, George; *Basic QoS Mechanisms Used in Routers*, Mar. 5, 2002, 20 pages.

Musunuri R. et al.: "Hierarchical-battery aware routing in wireless sensor networks" Vehicular Technology Conference, 2005, VTC-2005-Fall. 2005 IEEE 62nd Dallas, TX, USA Sep. 25-28, 2005, Piscataway, NJ, USA, IEEE, pp. 2311-2315, XP010878865; ISBN; 0-7803-9152-7, the whole document.

* cited by examiner

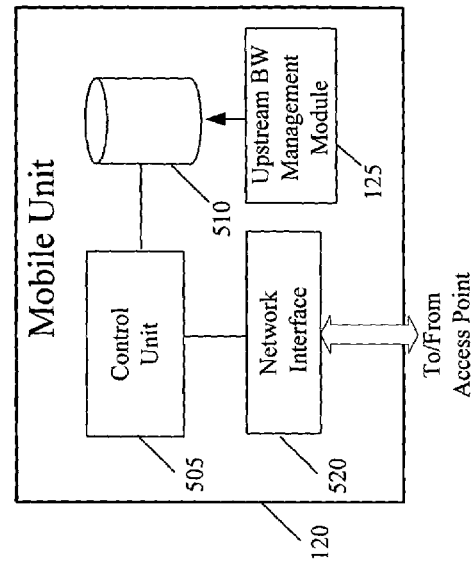
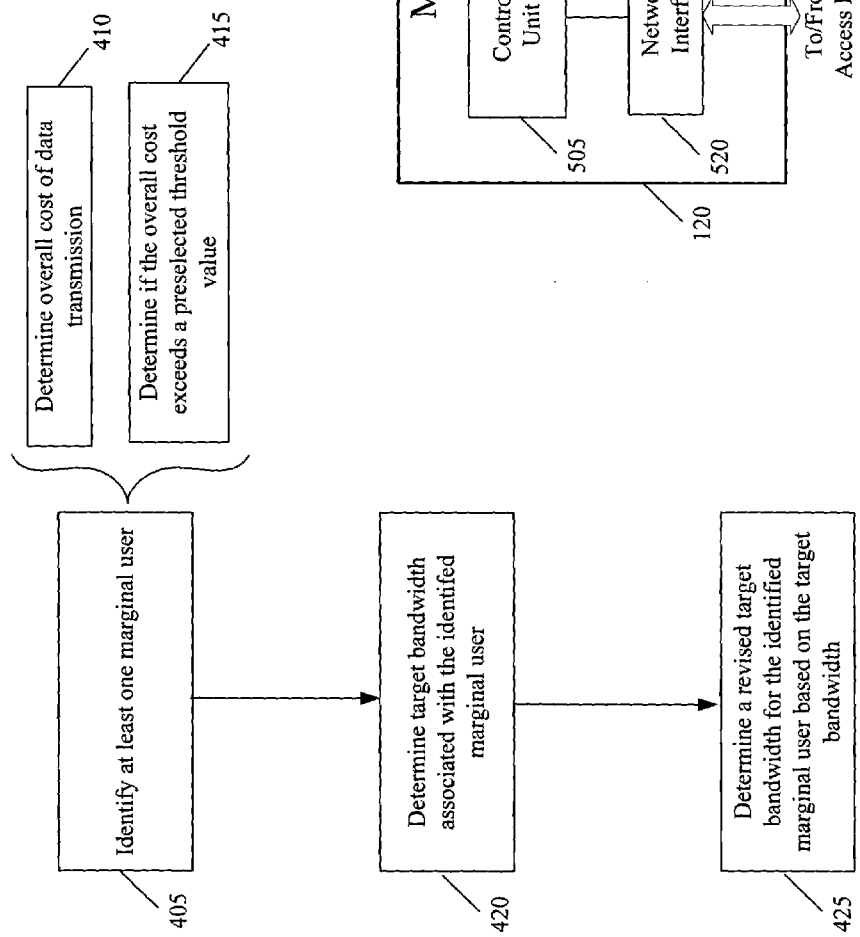
FIGURE 5
FIGURE 4

BANDWIDTH MANAGEMENT IN WIRELESS NETWORKS

REFERENCE TO PROVISIONAL APPLICATION

The present application claims priority to provisional application Ser. No. 60/498,570, filed Aug. 28, 2003, the entire text and figures of which are incorporated herein by reference without disclaimer.

BACKGROUND OF THE INVENTION

1. Field of the Invention

This invention relates generally to wireless networks, and, more particularly, to bandwidth management in a wireless network.

2. Description of the Related Art

A Wireless Local Area Network (WLAN) is a flexible data communications system that can either replace or extend a wired LAN to provide added functionality. A traditional, wired local area network (LAN) sends packets of data from one piece of equipment to another across cables or wires. A WLAN relies instead upon radio waves to transfer data. Data is superimposed onto a radio wave through a process called modulation, and this carrier wave then acts as the transmission medium, taking the place of a wire.

The usefulness of WLAN technology, however, goes beyond just the absence of wires. The advent of the WLAN opens up a whole new definition of what a network infrastructure can be. No longer does an infrastructure need to be solid and fixed, difficult to move, and expensive to change. Instead, it can move with the user and change as fast as the organization does. For example, business people can stay connected as they move throughout the corporate campus, easily tapping into the resources of the wired network.

Wireless Local Area Network technology has been targeted by analysts as one of the fastest growing sectors in the computing industry. WLANs are used in various vertical and horizontal applications (e.g., retail, manufacturing, logistics, healthcare, education, public space, etc.). A variety of wireless network standards have become popular, including the 802.11x standards that have been ratified by the Institute of Electrical and Electronics Engineering (IEEE). Exemplary IEEE 802.11x standards include 802.11, 802.11a, 802.11b (also known as Wi-Fi), and 802.11g.

Recently, there has been a surge in the deployment of 802.11-based wireless infrastructure networks especially in public "hot spots" covering airports, hotels, coffee shops, etc. to provide wireless internet access services. In the future, further proliferation of demanding multimedia applications, e.g., music and video streaming, and new location-based services, is expected. Because the 802.11 provides a shared medium to different users, there is a need for bandwidth management to protect the network from abuse and to allocate the available bandwidth according to user needs. Additionally, in the event a few isolated users are taxing network resources unduly due to high incidence of error during signal reception, there may be a need for some corrective measures to be taken to avoid penalizing the other users to maintain their target Quality of Service (QoS).

SUMMARY OF THE INVENTION

In one aspect of the instant invention, a method is provided for bandwidth management. The method includes receiving a value representative of a target bandwidth from a remote device; storing a data packet in a data queue; associating a quantum of bandwidth to the data queue, wherein the quantum of the bandwidth is a function of at least the target bandwidth and time; and transmitting the data packet based on at least the quantum associated with the data queue.

In one aspect of the instant invention, an apparatus is provided for bandwidth management. The apparatus includes an interface and a control unit. The control is adapted to receive, over the interface, a value representative of a target bandwidth from a remote device; store a data packet in a data queue; associate a quantum of bandwidth to the data queue, wherein the quantum of the bandwidth is a function of at least the target bandwidth and time; and transmit the data packet based on at least the quantum associated with the data queue.

In one aspect of the present invention, an article comprising one or more machine-readable storage media containing instructions is provided. The instructions, when executed, enable the processor to receive a value representative of a target bandwidth from a remote device; store a data packet in a data queue; associate a quantum of bandwidth to the data queue, wherein the quantum of the bandwidth is a function of at least the target bandwidth and time; and transmit the data packet based on at least the quantum associated with the data queue.

In one aspect of the present invention, a method is provided for congestion control. The method includes identifying a user experiencing transmission errors over a wireless medium, determining a target bandwidth allocated for the identified user, and adjusting the target bandwidth allocated for the identified user based on a level of transmission errors experienced by the identified user.

BRIEF DESCRIPTION OF THE DRAWINGS

The invention may be understood by reference to the following description taken in conjunction with the accompanying drawings, in which like reference numerals identify like elements, and in which:

FIG. 4 illustrates a flow diagram of a method for congestion control that may be implemented in the communication system of FIG. 1, in accordance with one embodiment of the present invention; and FIG. 5 is a block diagram of a mobile unit that may be implanted in the communication system of FIG. 1, in accordance with one embodiment of the present invention.

Figure 1:
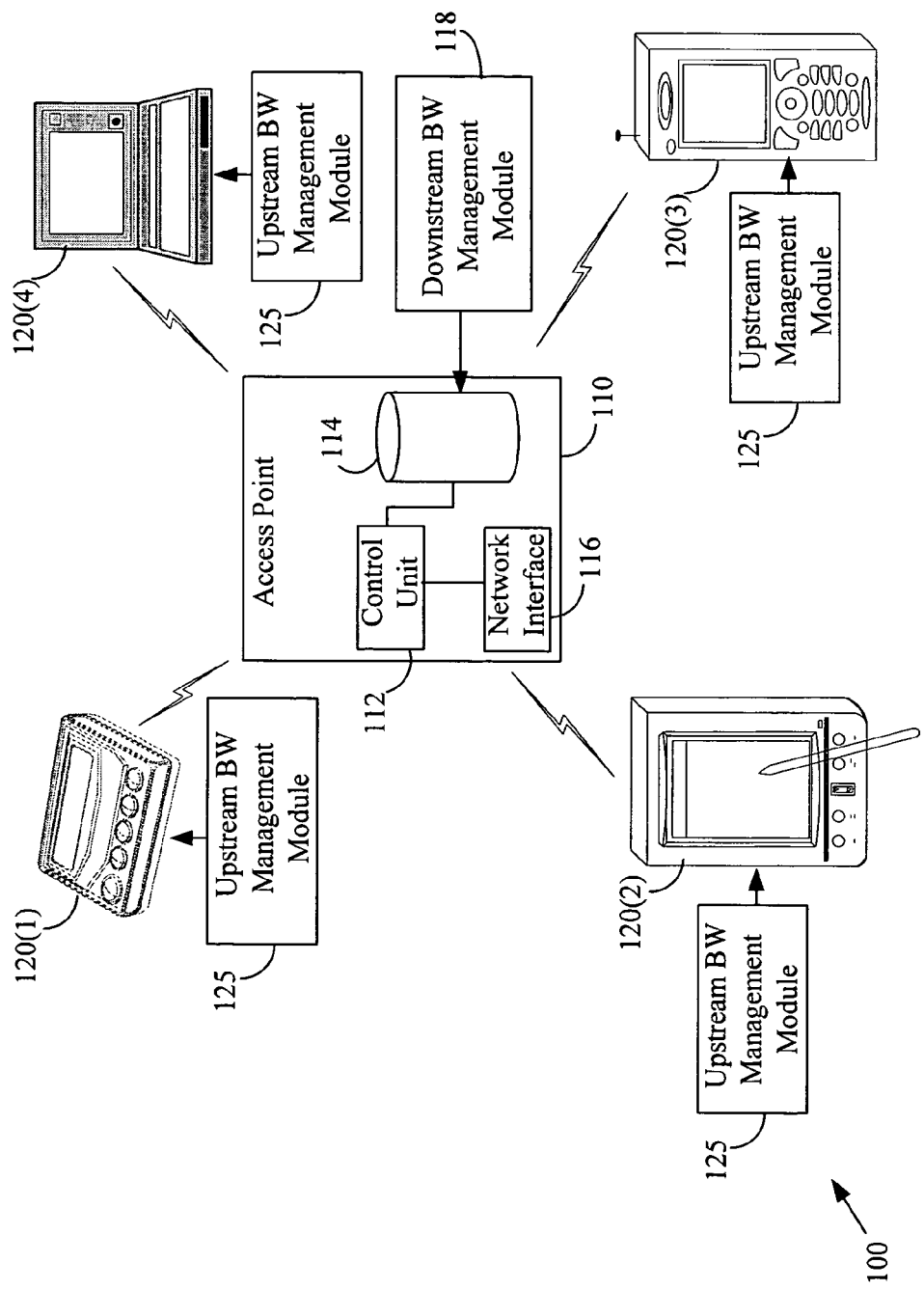
FIG. 1 is a block diagram of a WLAN in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, an exemplary embodiment of a Wireless Local Area Network ("WLAN") 100 is illustrated, in accordance with the present invention. The WLAN 100 includes an access point ("AP") 110 and one or more mobile units ("MUs") 120(1-4). The WLAN 100 may use a version of the IEEE 802.11 or a similar protocol. The MUs 120(1-4) may be any type of computing or processor-based device such as a desktop or laptop computers, personal digital assistants, mobile phones pagers, or any other device adapted to work in the WLAN 100.

The AP 110 may be, for example, a router, switch, or bridge that connects the wireless and wired networks. In the illustrated embodiment, the AP 110 includes a control unit 112 communicatively coupled to a storage unit 114 and a network interface 116. The control unit 112 is capable of executing one or more instructions to perform one or more desired task(s) for the AP 110. The storage unit 114 may include one or more software modules stored therein. The data packets are transmitted to and received from the MUs 120(1-4) through the network interface 116. Although not shown, in some embodiments, the AP 110 may include other components as well, including circuitry for transmitting/receiving data packets, circuitry for encrypting/decrypting data packets, and circuitry for other features commonly associated with the AP 110.

As is described in greater detail, in accordance with one or more embodiments of the present invention, the WLAN 100 provides committed bandwidth services to selected (e.g., premium) users of the MUs 120(1-4) through the access point 110. In one embodiment, the committed bandwidth services may be provided based on the type of data streams (e.g., data streams, video streams, voice streams, etc.). The access point 110 includes a module 118 that manages bandwidth allocation in the downstream direction (i.e., transmissions from the AP 110 to the MUs 120(1-4)). One manner in which the bandwidth may be managed in the downstream direction by the AP 110 is described in U.S. patent application Ser. No. 10/253,005, filed Sep. 23, 2002, which is a currently pending patent application, the contents of which are incorporated by reference in their entirety.

In accordance with one embodiment of the present invention, the MUs 120(1-4) include a module 125 for managing bandwidth in the upstream direction. In one embodiment, and as discussed below, the modules 118, 125 may also perform congestion control to identify and isolate (at least temporarily) users that may be consuming unreasonable amount of resources (e.g., bandwidth) due to poor signal quality.

It should be appreciated that the arrangement of the WLAN 100 of FIG. 1 is exemplary in nature and that, in alternative embodiments, the WLAN 100 may include any desirable number of MUs 120 and access points 110. The various modules 118 and 125 illustrated in FIG. 1 are implemented in software, although in other implementations these modules may also be implemented in hardware or a combination of hardware and software. In one embodiment, each module 118 and 125 may comprise a plurality of modules, with each of the plurality of modules capable of performing one or more desired acts. The modules 118 and 125, in one embodiment, may operate as a level 2 application.

Figure 2A:
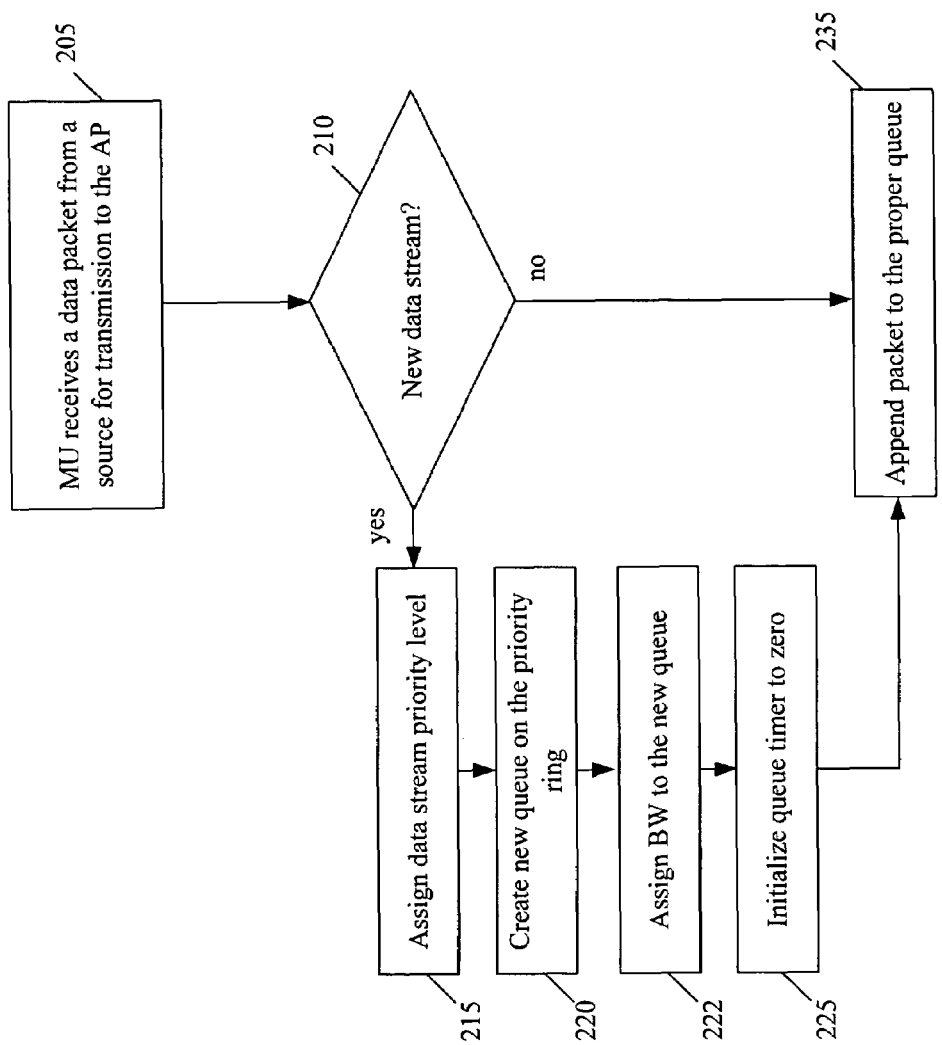
FIGS. 2A-B are flow diagrams of a method that may be implemented in the communications system of FIG. 1, in accordance with one embodiment of the present invention.
Figure 2B:
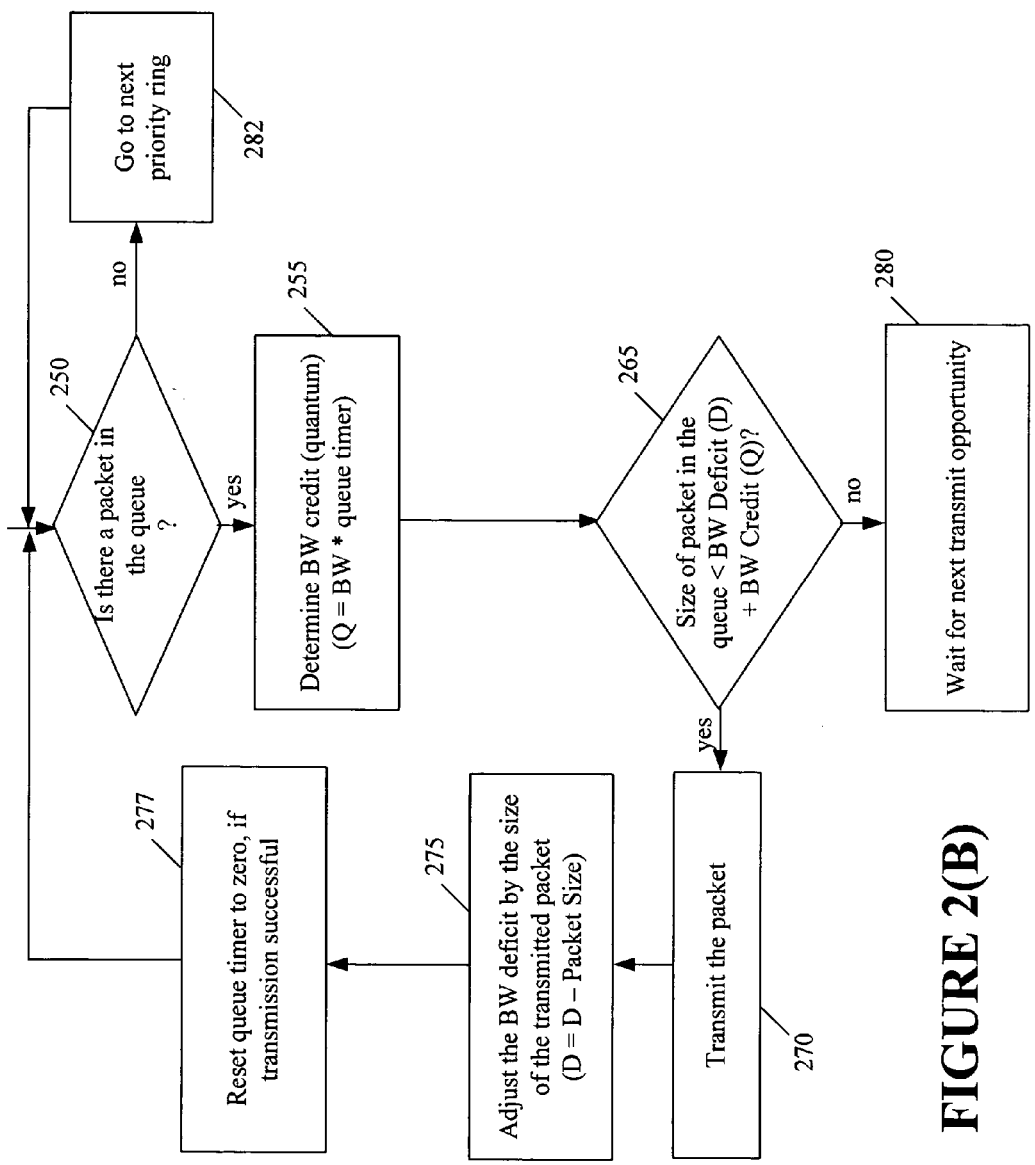
Figure 3:
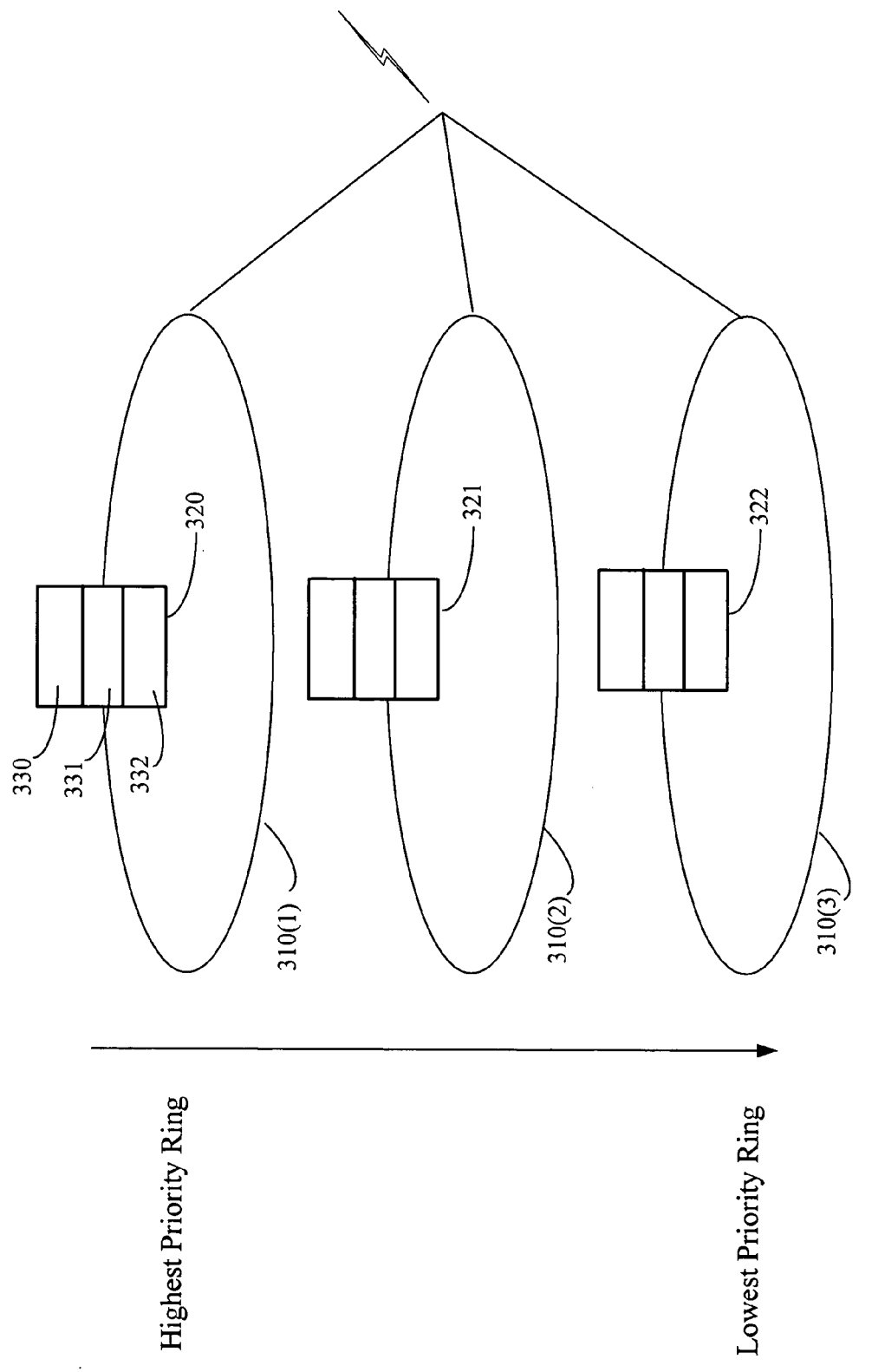
FIG. 3 is a block diagram of a priority scheme that may be implemented in a mobile unit that may be employed in the communication system of FIG. 1, in accordance with one embodiment of the present invention.

FIGS. 2A-B depict flow diagrams of a method in accordance with one embodiment of the present invention. FIG. 2A, in particular, illustrates a method for the MU 120 to manage received data from one or more sources for transmission to the AP 110. FIG. 2B illustrates a method for scheduling or servicing priority rings of the exemplary embodiment shown in FIG. 3, and also illustrates regulating data stream bandwidth usage. For illustrative purposes, the methods of FIGS. 2A-2B are described with reference to FIG. 1 and FIG. 3. FIG. 3 illustrates an exemplary embodiment of a priority scheme that may be employed in the MU 120.

In FIG. 2A, the module 125 of the MU 120 receives (at 205) a data packet from a source for transmission to the AP 110. The "source" of the data packet can vary, depending on the type of data being transmitted. For example, the source of the data may be an Internet browser desiring to access another resource on the Internet, it may be a video application transmitting video streams to a remote device, an audio application transmitting audio data to a remote device, a file transfer application transmitting a file to a remote device, and the like.

The module 125 of the MU 120 determines (at 210) if the received data packet is for a new data stream. A new data stream may be, for example, the beginning of a video download, a phone call, an e-mail message, and the like. The data stream may be addressed to a remote device for delivery through the AP 110. The module 125 may determine if the data packet is for a new data stream based on accessing information associated with the data packet. For example, the module 125 may determine if the data packet is for a new data stream based on the destination address associated with the data packet and/or based on various bits that indicate the data or stream type (e.g., video, telephone call, e-mail, and the like).

If it is determined that the data packet is for a new data stream, the module 125 of the MU 120 assigns (at 215) a priority level to the data stream. The priority level may be based on time delay needs, which may be dependent on the data type. For example, a telephone connection via the AP 110 may be a higher priority than a stream video connection because data associated with the telephone connection needs to be delivered in substantially real time. In contrast, real-time delivery of streaming video may not be as essential. The priority level for each of the various types of data streams may be set in a variety of manners. For example, the priority level may be set by the users of MUs 120(1-4), the system administrator of WLAN 100, the administrator of the AP 110, and the like.

The priority level may also be assigned based a contractual agreement between a user of the MU 120 and a network service provider. That is, the user of the MU 120 may subscribe to a service that provides a low delay, with a high data rate connection for a voice data stream (as opposed to the other types of data streams, including video and file transfer). In such a case, depending on the type of data stream, the MU 120 would receive the appropriate level of priority from the AP 110, for example, or from any other source having access to such information.

The module 125 of the MU creates (at 220) a new queue for the new data stream. The new queue is put on a priority ring, which also may be a queue, based on the priority level determined at block 215. FIG. 3 illustrates an exemplary embodiment of a priority scheme that may be employed in the MU 120. The MU 120 may include a plurality of priority rings 310(1-3), each representing a priority level. Moreover, each priority ring 310(1-3) may include one or more queues 320-322 in which data packets are stored. For example, in the illustrated embodiment, the first priority ring 310(1) includes a data stream queue 320 that requires a high priority. Similarly, the second priority ring 310(2) may contain a data stream queue 321 requiring medium priority, and the third priority ring 310(3) may contain a low-priority data stream 322. In one embodiment, data packets are processed in the following order based on a round-robin priority scheme: data packets from the first priority ring 310(1), from the second priority ring 310(2), and then from the third priority ring 310(3). In alternative embodiments, transmission priority may be assigned in other ways, including based on the relative amount of time that is apportioned to the various priority rings 310(1-3). For example, the first priority ring 310(1) may be assigned a larger transmission window, compared to the other rings 310(2-3), and the second ring 310(2) may be assigned a larger transmission window relative to the third ring 310(3), and so forth. In an alternative embodiment, each priority ring 310(3) may include a plurality of queues 320, in which case these queues 320 of a particular priority ring 310 can be serviced using a round-robin scheme, or any other suitable servicing scheme.

The queue 320 of the high priority ring 310(1) may contain a plurality of data packets 330-332. Similarly, the other queues 321-322 may also include a plurality of data packets. Each queue 320-322 may also have an address associated with it. The address may contain information that identifies the destination, and information identifying the data stream. The address may be contained within each data packet, so that the AP 110 may determine the destination of the packet.

The module 125 of the MU 120 assigns (at 222) a target bandwidth (BW) to each queue 320-322 that is associated with the data stream. The target BW may be assigned based on the data stream type (e.g., video, audio, etc.), or it may be a value that is negotiated and/or contracted with the network service provider. In one embodiment, the value may be tied to the various priority rings 310(1-3). For example, the queue 320 of the first priority ring 310(1) may be assigned bandwidth $BW_0$, the queue 321 of the second priority ring 310(2) may be assigned bandwidth $BW_1$, and the queue 322 of the third priority ring 310(3) may be assigned bandwidth $BW_2$, where, for example, $BW_0 > BW_1 > BW_2$. The various BWs assigned to the various priority rings 310(1-3), in one embodiment, may be provided by the AP 110 to the MU 120. By providing the target BWs to the MU 120, the AP 110 may, in one embodiment, dynamically change the target BWs that are associated with a given priority ring 310(1-3), on an as needed basis. The target BW(s) values may be transmitted by the AP 110 to the MU 120 using any suitable protocol, including the Wireless Network Management Protocol.

The MU 120 initializes (at 225) a queue timer. Each queue 320-322, in one embodiment, has its own queue timer. The queue timer for a given queue 320-322 is utilized to represent the length of time since a data packet from that queue 320-322 was previously successfully transmitted. As described below, the queue timer is utilized to regulate data packet transmission.

The module 125 of the MU 120 appends (at 235) the received data packet to the appropriate queue 320-322. If the data packet is for a new data stream (steps 205-225), it will be the first data packet in the queue 320-322. If, however, it is determined (at 210) that the received data packet is for an existing data stream, the data packet is appended (at 235) to the end of the corresponding queue 320-322. The queue data structure, in one embodiment, allows for the data packets in the queues 320-322 to be processed in a first-in, first-out order (FIFO) basis.

FIG. 2B illustrates the next stage of the method of scheduling the transmission of data packets in the queues 320-322 of the MU 120, and also illustrates regulating data stream bandwidth usage. In one embodiment, the method of FIG. 2B may be performed for each priority ring 310(1-3), starting from the first ring 310(1), then the second ring 310(2), and then to the third ring 310(3). For ease of illustration, the method of FIG. 2B is discussed with respect to scheduling the transmission of data packets in the queue 320 of the first priority ring 310(1). It should, however, be appreciated the scheduling method described can be similarly applied to the queues in the other rings 310(2-3).

The module 125 of the MU 120 determines (at 250) if there are any data packet(s) in the queue 320 of the first priority ring 310(1). Assuming that a data packet resides in the queue 320, the module 125 determines (at 255) bandwidth credit ("quantum" or "Q" for short) for the queue 320. The bandwidth credit, in one embodiment, is calculated using equation (1) below:

$$Q = BW_0 * \Delta T, \quad (1)$$

where $BW_0$ is the target bandwidth desired for the queue 320 (or the data stream associated with the queue 320), and $\Delta T$ is the time difference between two consecutive RF transmissions to the AP 110 by the MU 120. The bandwidth credit (or Q) is calculated based on randomly varying time intervals between RF transmissions. While in the illustrated embodiment, the $\Delta T$ is calculated based on the time difference between two RF consecutive transmissions, in alternative embodiments, other suitable intervals may also be employed without deviating from the spirit and scope of the present invention. Thus, in other embodiments, $\Delta T$ may represent more or fewer consecutive or even non-consecutive transmissions. The bandwidth credit (or the variable "Q") may be analogized to income owed to a worker by an employer. For example, if each week an employee makes $1,000 and has not been paid in 4 weeks, then the employer owes the employee $4,000. Similarly, if a video stream being transmitted from the MU 120 is assigned a 1.4 Megabits per second ("Mbps") data rate and no data packet for the data stream from the queue 320 has been transmitted in the past 4 milliseconds (ms), the MU 120 owes the queue 320 5.6 Kilobits (1.4 Mbps*0.004 seconds) of data.

The module 125 determines (at 265) if the data packet in the queue 320 should be transmitted by calculating whether the current packet size is less than the value of D+Q, where D is the bandwidth deficit (i.e., any carry over BW credits from previously) and Q is the bandwidth credit (calculated above in step 255). For example, assuming that the data packet 330 in the queue 320 is the next packet to be transmitted, the module 125 of the MU 120 determines if the size of the data packet 330 is less than the bandwidth deficit (D) plus the bandwidth credit (Q). If the packet size is less than the D+Q, then the data packet 330 may be prepared for transmission to the AP 110. For example, if the size of the data packet 330 is 1 Kilobit ("Kb"), and if the bandwidth credit Q associated with the queue 320 is 0.6 Kb and the bandwidth deficit is 0.6 Kb, then the size of the data packet 330 is less than D+Q (i.e., 1 Kb<0.6 Kb+0.6 Kb). In this example, therefore, the data packet 330 may be prepared for transmission. If, however, the size of the data packet 330 is greater than D+Q, then the BW deficit is carried over to the next transmit opportunity for the data packet 330.

The module 125 of the MU 120 transmits (at 270) the data packet if the size of the data packet in the queue 320 is less than D+Q. The module 125 adjusts (at 275) the bandwidth deficit (D) by the size of the transmitted data packet, as shown in equation (2) below:

$$D = D - \text{Size of the transmitted data packet} \quad (2)$$

Thus, for example, if the size of the bandwidth deficit (D) was 1.2 Kb before the data packet was transmitted, and the size of the transmitted data packet is 1 Kb, then the bandwidth deficit would be 0.2 Kb (1.2 Kb−1.0 Kb). In one embodiment, the adjustment to the bandwidth deficit (D) may be made upon determining that the data packet was successfully transmitted to the AP 110. The AP 110 may indicate a successful transmission, for example, by providing an acknowledgement (ACK) to the MU 120. The above-described process steps may similarly be repeated for other data packets in the queue 320 of the first priority ring 310(1).

In one embodiment, the MU 120 resets (at 277) the queue timer to zero, if the transmission (at 270) is successful. The check for successful transmission (at 270), in one embodiment, may be performed by a process executing in the background (that is, the check need not be a sequential check in the flow diagram of FIG. 2B but can be performed at any desired time or times after the packet has been transmitted to the access point 110 by a routine that processes received acknowledgements).

In the event the priority ring 310(1) includes more than one queue 320, the module 125 of the MU 120 may process the data packet(s) in these other queue(s) before returning to the first queue 320 to determine (at 250) if the first queue 320 has additional data packet(s). The data packets in these other queues may be processed in any desirable manner, including using a round-robin scheme.

If it is determined (at 265) that the size of the data packet in the queue 320 is not less than the D+Q, then the module 125 of the MU 120 waits (at 280) for the next opportunity to transmit the data packet. In the illustrated embodiment, the data packet is not transmitted as long as its packet size is more than D+Q. However, the amount represented by D+Q increases with time because the variable Q (BW credit) is a function of $\Delta T$ (see equation (1) above). Thus, as the D+Q value increases over time, and eventually becomes greater than the size of the data packet, the data packet is transmitted by the module 125 of the MU 120.

If it is determined (at 250) that there are no packets in the queue 320, the module 125 goes (at 282) to the queue 321 in the next priority ring 321 and repeats the method steps described above. If neither the first nor the second priority ring 320-321 has any data packets, then, in one embodiment, the module 125 of the MU 120 processes the queue 322 in the third ring 310(3).

While the methods of FIGS. 2A-2B have been described in the context of multiple priority levels (or rings), it should be appreciated that one or more embodiments of the present invention can also be applicable in which all of the queues 320-322 have the same priority level (or where priority levels are not employed).

Additionally, the method of FIG. 2B may also be applied to IEEE 802.11(e) to regulate bandwidth usage among the different traffic categories proposed for the 802.11(e) standard. The proposed enhancement to 802.11(e) include an Enhanced Distribution Coordination Function (EDCF) that introduces the concept of traffic categories. Under this proposal, each MU 120 has various traffic categories, or priority levels. Using EDCF, MUs 120(1-4) try to send data after detecting that the medium is idle and after waiting a period of time defined by the corresponding traffic category called the Arbitration Interframe Space (AIFS). A higher-priority traffic category will have a shorter AIFS than a lower-priority traffic category. Thus, MUs 120(1-4) with lower-priority traffic wait longer than those with high-priority traffic before trying to access the medium. As noted, the method of FIG. 2B can be applied to regulate bandwidth usage among the different traffic categories proposed for IEEE 802.11. The method of FIG. 2B can also be employed to regulated bandwidth usage within a traffic category of IEEE 802.11(e), where a traffic category may include one or more types of data streams. Thus, when a traffic category includes more than one type of data stream, the method of FIG. 2B can be utilized to regulate bandwidth usage among the different types of data streams within a traffic category.

It is noted that FIG. 2B illustrates processing of data packets in a priority ring 310 that includes one queue, although the invention can be extended to an arrangement in which one priority ring 310 includes multiple queues. In such an arrangement, the data packet(s) in these queues can be serviced in any desirable way, including using a round-robin scheme.

Referring now to FIG. 4, a flow diagram of a method for network congestion control is provided, in accordance with one embodiment of the present invention. The method of FIG. 4 may be implemented in the AP 110 by the module 118 and/or in the MU 120 by the module 125. Congestion control may be desired if a few isolated users are unduly taxing network resources due to high incidence of error during signal reception, and, as a result, the network becomes congested, thereby adversely affecting the network performance for the remaining users. As described in greater detail below, congestion control, in one embodiment, is achieved by identifying "marginal users" (or MUs 120(1-4)) that are using a disproportionate amount of network resources due to poor signal quality and by selectively reducing their target bandwidth in order to maintain the desired Quality of Service (QoS) for the remaining users or MUs 120(1-4).

A user (or MU 120) may receive poor signal quality from the AP 110 due to, for instance, co-channel interference, operation at the edge of a cell, and the like. A poor signal quality can result in a significant increase in the number of packets lost. Such a loss can be compensated in several ways. For example, a data packet can be repeatedly transmitted until it is either successfully transmitted or the limit for the number of retransmissions per packet is reached, in which case the packet is thrown away and is then considered lost. Alternatively, the transmitter (either the AP 110 or MU 120) can also decide to send certain packets at lower rates in an attempt to improve the probability of error-free transmission. These corrective actions can consume excess bandwidth resources, which in turn can lead to a reduction in the total airtime available to the remaining users. The users that consume excess bandwidth resources due to packet loss are referred to as "marginal users" for the purposes of this discussion.

The method of FIG. 4 is described from the point of view of the AP 110, although, as noted, the MU 120 may also perform selected steps of the illustrated congestion control method. The module 118 of the AP 110 identifies (at 405) at least one marginal user. In an alternative embodiment, each MU 120 may be able to identify itself as a marginal user. It may be desirable to identify marginal users to keep the network relatively congestion free and to ensure that the remaining users, such as premium users who may have contractually requested committed bandwidth from the service provider, continue to receive the desired Quality of Service (QoS). Marginal users may be identified, in one embodiment, by determining (at 410) the overall cost of data transmission for a given user and determining (at 415) if the overall cost exceeds a preselected threshold value. In one embodiment, the overall cost may determined (at 410) by keeping track of the rates used to transmit data to and from each user, as well as by tracking the percentage of data bytes lost and/or retransmitted. In the illustrated embodiment, the overall transmission cost, (or penalty factor) for data transmission to and from the MU 120 under consideration during the time period T can be calculated using equation (3) below:

$$PF = \frac{1}{N}\left(\sum_{n,k} \frac{S[F_{k,n}(r)]}{T[F_{k,n}(r)]} * \frac{S[F_{k,n}(r_{\max})]}{T[F_{k,n}(r_{\max})]}\right) \quad (3)$$

where $S[F_{k,n}(r)]$ represents the size of a fragment of the $n^{th}$ packet that was transmitted at r Mbps, $T[F_{k,n}(r)]$ is the estimated time required for successful transmission of the same and $r_{max}$ is the nominal maximum data rate. In equation (3), "r" may be 11, 5.5, 2, 1 Mbps (in the context of IEEE 802.11b) or it may be 54, 48, 36, 24, 18, 12, 9, 6 Mbps (in the context of IEEE 802.11a) or it may be 54, 48, 36, 33, 24, 22, 18, 12, 11, 9, 6, 5.5, 2, 1 Mbps (in the context of IEEE 802.11g), N refers to the total number of packets that were transmitted between the AP 110 and the MU 120 under consideration, and the summation over "k" includes each attempt at fragment transmission, irrespective of whether it was successful or not.

Table 1 below shows exemplary "penalty" or "cost" paid for substantially error-free transmission of a data packet of 1024 bytes at different bitrates:

TABLE 1

| Transmit Rate (Mbps) | Max Transmit Time (μs) | Rate Penalty Factor |
|---|---|---|
| 11 | 1011 | 1.0 |
| 5.5 | 1766 | 1.7 |
| 2 | 4408 | 4.4 |
| 1 | 8656 | 8.5 |

In Table 1, the last column "Rate Penalty Factor," represents approximately the additional cost factor associated with transmitting a packet of size 1024 bytes at a rate lower than the nominal maximum of 11 Mbps (i.e., in the context of 802.11). The values in Table 1 are exemplary in nature, and have been provided for illustrative purposes only.

Once the overall cost (or the penalty factor) is determined (at 410), the module 118 of the AP may identify (at 405) a marginal user by determining (at 415) if the overall cost exceeds (at 415) a preselected threshold value. The preselected threshold value may be any suitable value that indicates the effective bandwidth (total airtime used to transmit data) utilized by a marginal user is in excess of that allowed, by virtue of its high packet loss percentage and/or lower than the nominal maximum (e.g., 11 Mbps) transmission rate.

Based on identifying (at 405) at least one marginal user, the module 118 of the AP 110 determines (at 420) a target bandwidth associated with the identified marginal user (or the MU 120). The target bandwidth may be assigned based on a contractual agreement between a user of the MU 120 and a network service provider. That is, the user of the MU 120 may subscribe to a service that provides a committed bandwidth level to the user during a connection. In one embodiment, the committed bandwidth may be assigned to the user based on the types of data streams (e.g., committed bandwidth for voice streams, but not for video streams). If the method of FIG. 4 is implemented in the MU 120, the act of determining (at 420) the target bandwidth may comprise receiving the target bandwidth(s) transmitted from the AP 110. Any suitable protocol may be employed to transmit the target bandwidth(s) from the AP 110 to the MU 120, including the Wireless Network Management Protocol (WNMP).

Based on determining (at 420) the target bandwidth associated with the marginal user, the module 118 of the AP determines (at 425) a revised target bandwidth for the identified marginal user based on the original target bandwidth. It is desirable to revise the target bandwidth for the marginal user to reduce or avoid congestion in the wireless medium. In one embodiment, the target bandwidth for the marginal user is revised (at 425) using equation (4) below:

$$BW_c = \frac{BW_0}{PF}, \quad (4)$$

where $BW_c$ is the revised bandwidth, $BW_0$ is the original allocated target bandwidth (in either the upstream or downstream directions) for a marginal user, and PF is the penalty factor calculated in equation (3). The revised bandwidth substantially ensures that even under conditions of high loss and low transmission rate, the marginal user effectively uses substantially the same bandwidth that was originally allotted to the user in each direction, while the actual rate of successful data transmission is upper bounded by $BW_c$, and the remaining users continue to receive their allocated target bandwidth without any loss of quality.

Thus, the congestion control method illustrated in FIG. 4 reallocates the available resources (bandwidth) amongst marginal users, depending on the cost of data transmission associated with them. In one embodiment, this is accomplished by using an overall penalty factor PF for each marginal user such that the effective bandwidth, or equivalently, the effective airtime used, during transmission attempts to and from the user remains approximately equal to the originally allocated bandwidth.

Referring now to FIG. 5, a block diagram of one embodiment of the MU 120 of FIG. 1 is illustrated. The MU 120 includes a control unit 505 communicatively coupled to a storage unit 510 and a network interface 520. The control unit 505 is capable of executing one or more instructions to perform any desired task(s) for the MU 120. The storage unit 505 may include one or more software modules stored therein, including the module 125. The data packets are transmitted to and received from the AP 110 through the network interface 520. Although not shown, in some embodiments, the MU 120 may include other components as well, including circuitry for transmitting/receiving data packets, circuitry for encrypting/decrypting data packets, and other features commonly associated with the MU 120.

The various system layers, routines, or modules may be executable control units (such as control unit 112, 505 (see FIGS. 1 and 5)). The control unit 112, 505 may include a microprocessor, a microcontroller, a digital signal processor, a processor card (including one or more microprocessors or controllers), or other control or computing devices. The storage devices 114, 510 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices 114, 510. The instructions when executed by a respective control unit 112, 505 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of operating a wireless mobile unit in a wireless local area network (WLAN), comprising:
    determining that a new data stream is to be transmitted by the wireless mobile unit;
    assigning one of a plurality of different data stream priority levels to the new data stream, resulting in an assigned priority level;
    creating a new data stream queue, at the assigned priority level, for the new data stream;
    assigning, to the new data stream queue, a value representative of a target bandwidth expressed as a target quantity of bits per second, wherein the target bandwidth corresponds to the assigned priority level, each of the plurality of different data stream priority levels has a different target bandwidth associated therewith, and the wireless mobile unit receives the different target bandwidths from a remote wireless access device in the WLAN;
    storing a data packet of the new data stream in the new data stream queue, the data packet having a number of bits;
    maintaining a queue timer for the new data stream queue, the queue timer providing a time value that represents time between at least two successive transmissions of data packets of the new data stream from the new data stream queue;
    associating a quantum of bandwidth to the new data stream queue, wherein the quantum of bandwidth is expressed as a quantity of bits, and wherein the quantum of bandwidth is calculated from the multiplied product of the target bandwidth and the time value; and
    transmitting the data packet based on at least the quantum of bandwidth associated with the new data stream queue;
    wherein for each new data stream, the wireless mobile unit assigns a respective data stream priority level, creates a respective data stream queue at the respective data stream priority level, and assigns a respective target bandwidth to the respective data stream queue to prioritize and manage transmit bandwidth.

2. The method of claim 1, wherein the assigned priority level is determined at least as a function of data type, and wherein the act of transmitting the data packet comprises transmitting the data packet based on the assigned priority level.

3. The method of claim 1, wherein transmitting the data packet comprises transmitting the data packet to the remote wireless access device in the WLAN.

4. The method of claim 1, wherein the value representative of a target bandwidth corresponds to a data type.

5. The method of claim 1, wherein the time value comprises the time between two successive transmissions of data packets of the new data stream from the data queue.

6. The method of claim 1, further comprising determining a bandwidth deficit associated with the new data stream queue, and wherein transmitting the data packet comprises transmitting the data packet in response to determining that a size of the data packet is less than the total of the bandwidth deficit and the quantum of bandwidth.

7. The method of claim 1, further comprising:
    determining that the wireless mobile unit is experiencing transmission-related errors;
    adjusting the value representative of the target bandwidth based on a level of transmission-related errors experienced by the wireless mobile unit.

8. A mobile wireless apparatus for operation in a wireless local area network (WLAN), comprising:
    an interface; and
    a control unit communicatively coupled to the interface, the control unit adapted to:
        receive, over the interface, a value representative of a target bandwidth expressed as a target quantity of bits per second from a remote wireless access device in the WLAN;
        store a data packet in a data queue, the data packet having a number of bits;
        maintain a queue timer for the data queue, the queue timer providing a time value that represents time between at least two successive transmissions of data packets from the data queue;
        associate a quantum of bandwidth to the data queue, wherein the quantum of bandwidth is expressed as a quantity of bits, and wherein the quantum of bandwidth is calculated from the multiplied product of the target bandwidth and the time value; and
        transmit the data packet to the remote wireless access device based on at least the quantum associated with the data queue, wherein the data queue is associated with a priority level that is determined at least as a function of data type, the act of transmitting the data packet comprises transmitting the data packet based on the priority level, and the target bandwidth varies in accordance with the priority level.

9. The apparatus of claim 8, wherein the priority level is determined based upon a contractual agreement between a user of the wireless mobile apparatus and a network service provider.

10. The apparatus of claim 8, wherein the control unit is adapted to receive the value from an access point and to transmit the data packet to the access point.

11. The apparatus of claim 8, wherein the time value comprises the time between two successive transmissions of data packets from the data queue.

12. The apparatus of claim 8, wherein the control unit is further adapted to determine a bandwidth deficit associated with the data queue and adapted to transmit the data packet in response to determining that a size of the data packet is less than the total of the bandwidth deficit and the quantum of bandwidth.

* * * * *